United States Patent [19]

Goujon

[11] Patent Number: 5,690,116
[45] Date of Patent: Nov. 25, 1997

[54] METHOD FOR AUTOMATIC MEASUREMENT OF THE DOPPLER ANGLE AND ARRANGEMENT FOR CARRYING OUT THE METHOD

[75] Inventor: Antoine Goujon, Paris, France

[73] Assignee: U.S. Philips Corporation, New York, N.Y.

[21] Appl. No.: 687,473

[22] PCT Filed: Nov. 24, 1995

[86] PCT No.: PCT/IB95/01055

§ 371 Date: Aug. 6, 1996

§ 102(e) Date: Aug. 6, 1996

[87] PCT Pub. No.: WO96/17549

PCT Pub. Date: Jun. 13, 1996

[30] Foreign Application Priority Data

Dec. 7, 1994 [FR] France ............................ 94 14729
Nov. 10, 1995 [EP] European Pat. Off. .......... 95203071

[51] Int. Cl.⁶ .................................................. A61B 8/00
[52] U.S. Cl. .................................................. 128/661.08
[58] Field of Search ...................... 128/660.05, 660.07, 128/661.07–661.1, 916; 364/413.25

[56] References Cited

U.S. PATENT DOCUMENTS

| 5,305,753 | 4/1994 | Wilson | 128/661.08 |
| 5,465,721 | 11/1995 | Kishimoto et al. | 128/916 X |
| 5,495,852 | 3/1996 | Stadler et al. | 128/661.1 X |

*Primary Examiner*—Francis Jaworski
*Attorney, Agent, or Firm*—Jack D. Slobod

[57] ABSTRACT

Automatic measurement is made of the angle DA enclosed by the direction of ultrasonic echographic excitation and the axis of a vessel in an echographic image on the basis of prior designation of an initial point $P_i$ in the vessel. A first isotropic tracing of rays starting from the initial point $P_i$ is used to produce a histogram of the grey levels of the points of the rays. An algorithm is then applied to the histogram in order to classify the grey levels of selected points. A second tracing of rays is made which is restricted to the walls of the vessel and results in a local mark with triangular sectors from which the slope (a) of a regression line is determined and the calculation of the Doppler angle DA is made as DA=Arc tg(a).

11 Claims, 3 Drawing Sheets

METHOD FOR AUTOMATIC MEASUREMENT OF THE DOPPLER ANGLE AND ARRANGEMENT FOR CARRYING OUT THE METHOD

The invention relates to a method for automatic measurement of the Doppler angle DA, enclosed by the direction of an echographic excitation and the axis of a blood vessel in an ultrasonic echographic grey-level image, on the basis of prior designation of an initial point situated in the vicinity of the axis of the relevant vessel.

The invention also relates to an arrangement for carrying out the method.

In order to provide a quantitative measure of the speed of blood in arteries, a method for the ultrasonic imaging of speeds by colour encoding is based on knowing the angle between the incident ultrasonic beam and the local axis of the vessel. This holds for all ultrasonic signal processing methods currently carried out to produce a colour-encoded representation of flows in any commercially available echograph. Moreover, reliable determination of this angle, referred to as the Doppler angle, is necessary to extract echographic data of parameters whose measurement is rather complex and to make further progress in the study of the behaviour of arteries.

Considering the foregoing, it would be justified to conceive and carry out an automatic process for the extraction of the value of the Doppler angle from a medical ultrasonic image with a high precision, for example of the order of 1 degree.

The Doppler angle still is a difficult aspect of all commercially available apparatus: the radiologist must determine the value thereof in a rather approximative manner by judging the alignment of a small line segment traced in the image with respect to the axis of the blood vessel analyzed.

From Japanese Patent No. 5-31110 it is known to detect automatically the angle enclosed by the direction of the blood flow with respect to the direction of an echographic beam. Via a transmission using an echographic probe comprising several transducers, followed by a separate analysis in respect of phase and frequency of the reflected beams received in two receiving sections of the probe, a given Doppler displacement is determined wherefrom a speed vector can be deduced at the point affected by the probe; this corresponds to the determination of a Doppler angle. However, it is very difficult to carry out a direct measurement without an intermediate echographic image, because it is not ensured that the axis of the blood vessel probed is indeed present in the plane of the image of the artery as is necessary for the measurement of the Doppler angle. When the axes of the echographic excitation and that of the vessel are not situated in the same plane, the detection of the Doppler angle remains possible, but it is liable to be affected by substantial errors; this is not acceptable when the required precision is of the order of approximately 1 degree.

It is an object of the invention to provide a method for automatic measurement of the Doppler angle of a trace of a blood vessel in an echographic image, starting from a designated point in the direct vicinity of said trace.

It is another object of the invention to provide a method for automatic measurement of the Doppler angle which is exact and fast.

It is another object to provide an arrangement for carrying out the above measuring method.

These objects are achieved, and the drawbacks of the prior art are mitigated, in that the method of the kind set forth is characterized in that it includes the following steps:

a) a first isotropic tracing of rays from said initial point, said rays traversing the echographic image partly or entirely so as to provide a histogram of the grey levels of selected points which are regularly distributed along said rays, b) executing an image processing algorithm which is applied to said histogram in order to classify the grey levels of said selected points into at least two categories $CL_1$, $CL_2$, ..., two adjacent classes being separated by thresholds $T_1$, $T_2$, ..., expressed in grey levels, one of the classes $CL_i$, bounded by the lower threshold $T_{i-1}$, being representative of walls of blood vessels in said image, c) a second tracing of rays from said initial point, during which the grey level of each point of each ray is compared with the threshold $T_{i-1}$ and each ray is restricted to the first end point Pl encountered whose grey level is equal to or higher than $T_{i-1}$, resulting in a representation of said blood vessel in the form of a first local mark which is composed of triangular sectors which have said starting point within said first local mark in common, d) determination of the slope a of the regression line of said first local mark by application of a linear regression method to the N pixels, having the coordinates x(n) and y(n) of said first local mark, as:

$$a = \frac{N(S)x(n)y(n) - (S)x(n)(S)y(n)}{N(S)x(n)x(n) - (S)x(n)(S)x(n)} \quad (1)$$

where:

$$(S) \text{ means } \sum_{n=1}^{n=N}$$

e) and calculation of the Doppler angle as:

$$DA = \text{Arc Tg (a)}.$$

As is often the case, an echographic image may contain the trace of several vessels. Therefore, the radiologist wishing to measure the angle should first designate the vessel of interest, for example by way of the mouse of a workstation on the screen of which the echographic image would be displayed. Said initial point can thus be designated, after which the method for measuring the Doppler angle in accordance with the invention is automatically performed in an exact and very fast manner.

An attractive version of the invention is characterized in that the method described above includes the supplementary step of validation which consists in validating the value of the Doppler angle DA only for a correlation coefficient r of the pixels of said first local mark which exceeds a threshold Rm of predetermined value between 0 and 1, where:

$$r = \frac{N(S)x(n)y(n) - (S)x(n)(S)y(n)}{\sqrt{N(S)x(n)x(n) - (S)x(n)(S)x(n)} \sqrt{N(S)y(n)y(n) - (S)y(n)(S)y(n)}} \quad (2)$$

The value chosen for Rm is preferably larger than 0.5, thus imposing a minimum quality criterion on the angle measurement performed.

For the calculation of the slope a in conformity with the expression (1) and of the coefficient r in conformity with the expression (2) in a further preferred version of the invention it is particularly attractive to perform the calculation of the terms involved in the expressions (1) and (2) for each triangular sector, formed by two rays whose ends have the coordinates x(m), y(xm) and x(M), y(xM) (where $XM \geq xm$), on the basis of the following analytical formula:

$$sf = \int_{x_o}^{x_1}\int_{y_o}^{y_1} f(x,y)dx\,dy + \int_{x_1}^{x_2}\int_{y_2}^{y_3} f(x,y)dx\,dy \quad (3)$$

in which the function f(x,y) is given the following successive values: 1; x; y; xy; xx; yy, and the terminations $x_0$, $x_1$, $y_0$, $y_1$, $x_2$, $y_2$, $x_3$ are simple linear functions of coordinates of said end points of the two rays (notably: $x_0=0$, $x_1=xm$, $x_2=xM$), with 6 sets of possible values associated with 6 respective classes of different triangular sectors.

It is to be noted that in the above method for automatic measurement in the step d) for determining the slope a, being representative of the slope of the axis of said blood vessel, this slope a can be obtained as:

$$a = \frac{-2(S)x(n)y(n)}{(S)x(n)x(n) - (S)y(n)y(n) + \sqrt{4((S)x(n)y(n))^2 + ((S)x(n)x(n) - (S)y(n)y(n))^2}}$$

in which a is the slope of the inertial axis of said first local mark.

Another version can also be envisaged for the supplementary step for validating the value of the Doppler angle DA automatically measured by means of the method in accordance with the invention. This supplementary validation step consists, for example, in validating the Doppler angle DA only if the symmetry of said local mark with respect to its regression line (or its inertial axis) is considered to be sufficient, said symmetry being deduced from the calculation of the centred moment of order 3, being sk(f):

$$sk(f) = \frac{\frac{(S)y(n)(x(n) - mx)^3}{(S)y(n)}}{\left[\frac{(S)y(n)(x(n) - mx)^2}{(S)y(n)}\right]}$$

where:

$$mx = \frac{(S)y(n)x(n)}{(S)y(n)}$$

and f is the function:

y(n)=f(x(n)), where n is within [1, . . . , N], the centred moment of order 3 being calculated for two curves which are representative of the function f:

sk1 for the curve formed by the extremities of rays of said local mark which are situated above the regression line (or the inertial axis) taken as the axis of the abscissae (y>0), sk2 for the curve formed by the extremities of rays situated below said line (y<0), the values of sk1 and sk2 being compared afterwards.

In order to perform the comparison, a start is made from the mark of the axis determined by the slope a, previously defined, and first sk1 and sk2 are calculated as indicated above. Subsequently, the following tests are successively carried out in order to obtain the reliability coefficient:

1—if the absolute value of sk1 and absolute value of sk2 are smaller than 1, the mark is reasonably symmetrical:

reliability=100%

2—if not, if sk1 and sk2 have the same sign (comparable dissymmetry of the two curves), the following estimate is made:

reliability=100.0*(1−|sk1−sk2|/|sk1+sk2|)%

3—if not, the mark is not sufficiently symmetrical with respect to its axis:

reliability=0%

In order to ensure that the automatic measurement of the Doppler angle is correct, the radiologist should select the initial point within the vessel for which the Doppler angle is to be measured and, even if it is situated therein, it may occur that the initial point chosen is situated very close to the wall of the vessel; this is not an optimum situation. Another preferred version of the invention, enabling further enhancement of the measurement of the Doppler angle, is characterized in that it includes a supplementary step for positioning which consists in calculating the centre of gravity G of said first local mark, said centre of gravity G then being chosen as the new initial point which has been optimized for optimized determination of the Doppler angle DA by way of the method for measurement as defined in the foregoing paragraphs. This operation, consisting in shifting the initial point to a new initial point which is formed by the centre of gravity of the previously obtained local mark, can advantageously be repeated several times.

In order to carry out the method of the invention, it is proposed to use an arrangement (preferably a special-purpose workstation) which includes:

a memory for storing grey-level values of the echographic image in the form of a matrix of pixel values, a screen displaying the echographic image in the form of a two-dimensional matrix of pixels, pointer means for said initial point in the image, and calculation means having access to said memory and to the pixel which is representative of said initial point, said calculation means being specifically programmed so as to execute the algorithms and calculations necessary for carrying out the method.

The automatic and exact supply of the Doppler angle as permitted by the present invention facilitates the interpretation of given information of ultrasonic origin on the screen of the echography apparatus, or on that of a workstation connected thereto, and makes it more interactive for the operator.

All ultrasonic echography systems available at present utilize the measurement of the speed of a blood flow via one and the same technique which is based on the Doppler effect. The differences between systems occur at the level of the implantation for which two techniques coexist: the so-called "frequential" approach of the conventional Doppler and the "temporal" approach developed notably by Philips; in this respect reference is made to European Patent No. 0 225 667 (PHF 85/593).

In all practical cases ultrasonic pulses are injected into the medium to be analyzed, presumably containing a blood vessel, with a period T (Pulse Repetition Frequency or PRF) and the ultrasonic signal returned by the medium in response to each pulse is recorded by the echograph (lines RF). Each sample of the lines RF thus represents the reflectivity of the medium at a given depth z or, equivalently, corresponds to a given time of flight t for the pulse. It is to be noted that the signal returned has travelled from the probe to the scatter centre and back; if c is the speed of sound in the medium analyzed, therefore:

z=ct/2.

In a window situated at a given depth on a line RF (for example, in a blood vessel), the signal slice corresponds to a "signature" which belongs to the instantaneous spatial distribution of the scatter centres (blood cells) in the interacton volume (resolution cell) between the medium analyzed and the ultrasonic beam. This signature belongs to a particular disposition of scatter centres in the resolution cell, because it is the result of interference between all secondary sources constituting these scatter centres (speckle); statistically speaking it is quasi inimitable.

Consequently, if the PRF is low enough so that the scatter centres do not have time to change their spatial disposition significantly between two successive RF line acquisitions, a same group of scatter centres will impress strongly resembling signatures from one line to another, and its shift in the depth direction can be detected and followed in the course of time. It is during this phase of following at a given depth that the temporal technique (referred to as CVI or Colour Velocity Imaging) and the frequential (or Doppler) technique differ: the Doppler technique marks the shift of a signature while analyzing the evolution of the local frequency of the successive lines RF, whereas the CVI technique directly analyses the temporal signal of the lines RF.

The shift of a given signature between two successive lines enables recourse to the speed v of the group of associated scatter centres via the time shift dt estimated by the CVI (dt=2vT/c) or the dephasing estimated by the Doppler technique (df=2πf dt, where f is the ultrasonic frequency of the pulse). Thus, these two methods are equivalent in theory.

If the angle DA enclosed by the axis of the ultrasonic beam and the direction of the flow of scatter centres is called the Doppler angle, the speed of the group of scatter centres considered, observed on the propagation axis of the pulses, will be the projection v cos(DA) of its real speed v, it being readily possible to derive therefrom the expression:

$v=c\ dt/(2T \cos (DA))$.

Consequently, the Doppler angle constitutes a fundamental parameter for the estimation of the speed of a blood flow in an ultrasonic echograph, regardless of the method used for this estimation.

At present there are four major types of applications (referred to herein as A, B, C, D) enabling the encoding or usage of the speed information of a blood flow in a manner suitable for use in the medical field:

| A | the representation of the speed information in the form of an image or colour speed map, |
| B | the representation in the course of the evolution time of the dynamic of the speeds or a histogram of the speed distribution (Doppler spectrum), |
| C | the determination of the blood flow rate (Philips CVI-Q), |
| D | the extraction of arterial parameters linked to the study of the dilatation of the vessels in the course of the cardiac cycle. |

The first three of these techniques appear to be functions linked to the measurement of the Doppler angle by way of the dependence of the speed on this parameter. The basic expressions for estimating the speed of a group of scatter centres on the basis of a time shift dt (CVI) or a frequency shift df (Doppler) confirm:
CVI: v=cdt/(2T cos (DA))
Doppler: v=cdf/(4π fr cos (DA))
The technique D for that matter utilizes a dependency on sin(DA).

Principle of Colour Speed Mapping (Application A).

An echograph display, by default, a reflectivity image in grey levels which is formed by a juxtaposition of lines RF whose envelope has been taken and which are recorded side-by-side in order to cover the zone of interest (mode B). These lines do not relate to the lines used for estimating the speed. A map of the speed distribution is formed by superposing on said reflectivity image a dynamic image (in the course of the cardiac cycle) whose colour scale corresponds to the scale of the instantaneous speeds observed in conformity with a given correspondence rule (colour intensity proportional to the speed, colour a function of the sign of the speed, . . .).

In practice supplementary pulses (referred to as "colours") are emitted by the probe during the conventional image scanning and the above processing operation is applied thereto in order to detect shifts in the image region of interest (presumably containing a blood vessel). The parameter dt (or df) is estimated in all locations of the lines RF "colours" corresponding to a pixel of the region of interest, and a colour is assigned to said pixel in the dynamic image simply by application of the speed-colour correspondence rule (or equivalently dt-colour or df-colour).

In these circumstances a version of the method of the invention, adapted to CVI (temporal or frequential), comprises a supplementary step which consists of automatically correcting said speed colour scale so as to ensure that it contains the dynamic of the speeds observed along the axis of said blood vessel, by automatically displaying the maximum positive and negative values of these speeds at the two extremities of said scale.

Principle of the Speed Distribution Histogram (Application B)

An echographic image (grey levels or colour) corresponds to the emission of pulses which are spatially shifted relative to one another in order to scan the zone of interest of the medium. An alternative consists of injecting the successive pulses in the same location of the medium, so that the evolution of the lines RF in the course of time (mode M) can be observed. If "colour" excitations are mixed in this emission and are processed in the same way as described above or the estimation of the parameter dt (or df) at the locations of the blood flow, the evolution of the speed distribution in the course of time can be observed in the relevant segment of the vessel.

The representation of this evolution takes the form of a histogram showing the dynamic of the speeds as a function of time (either dt or df as a function of time). The histogram in question, corresponding to a true spectrum when it stems from the frequency analysis, is called a Doppler spectrum. The principle of its composition is very simple: the extremities of the dynamic of the parameter observed on the corresponding colour lines are considered at the instant t before they are represented, and there is obtained dt min<dt<dt max. Therefrom, the value of the Doppler angle DA being known, there is deduced the speed dynamic to be represented for this instant t:

$c\ dt\ min/(2T \cos (DA))<v<c\ dt\ max/(2T \cos (DA))$.

Thus, this speed dynamic is represented by plotting a line vertically to the abscissa t of the histogram, limited and governed by the extreme speed values observed.

In these circumstances an attractive version of the method for automatic measurement in accordance with the invention, in which the evolution of the speed distribution in the course of time in the relevant segment of the vessel in the mode M is represented, on a screen provided for this purpose, in the form of a histogram showing the dynamic of the speeds as a function of time, referred to as a Doppler spectrum, comprises a supplementary step which consists of automatically correcting the scale of the speeds represented in said Doppler spectrum in order to ensure that it contains the dynamic of the speeds observed along the axis of said blood vessel.

It is to be noted that for all envisaged applications of the invention it is advantageous when the automatically measured value of the Doppler angle DA is automatically displayed in a field of the screen containing the echographic data.

These and other aspects of the invention will be apparent from and elucidated with reference to the embodiments described hereinafter.

For the sake of clarity, the contrast has been reversed in the FIGS. 2, 3, 4, 5.

Figure 1:
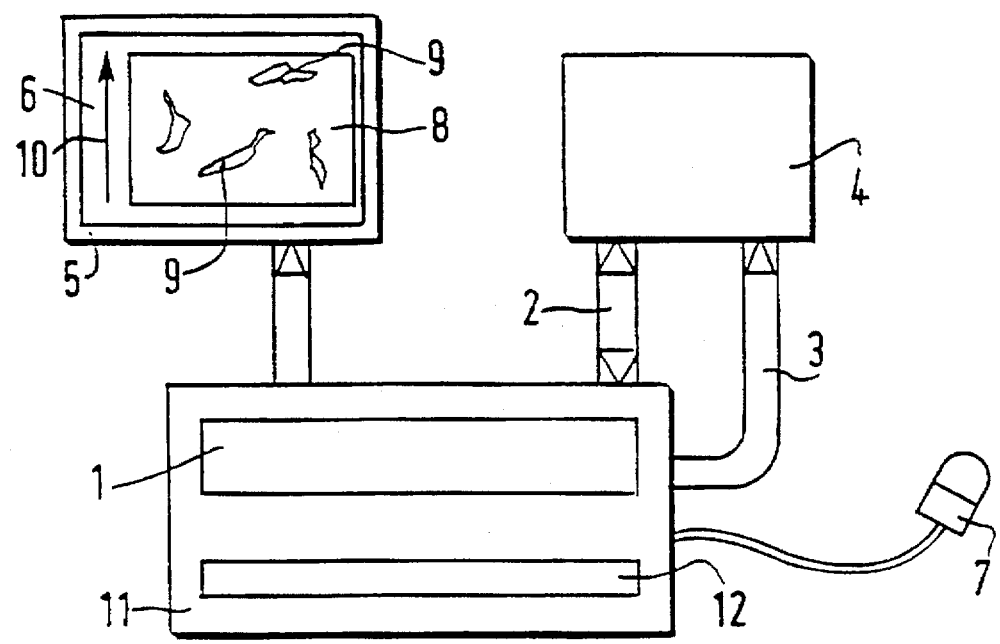
FIG. 1 shows the diagram of a workstation specifically arranged to carry out the invention.

The workstation shown in FIG. 1 comprises, in known manner, a microprocessor 1 which is connected to a memory 4, via a bidirectional data bus 2 and an address bus 3, and comprises two peripheral apparatus which are formed by a monitor 5 for the display of data stored in the memory 4 on a screen 6 and a mouse 7 which enables the marking and tracing of points on the screen 6. When an echographic image 8 whose data are stored in the memory 4 in the form of pixels representative of grey levels is displayed on the screen 6, a radiologist is faced with the customary problem of determining the orientation of traces such as 9 which stem from given blood vessels in the image whose echographic excitation direction is represented by the vector 10. Therefore, normally a small segment of a straight line which is oriented approximately in conformity with the estimated largest diameter of the relevant trace is superposed on the relevant trace by means of the mouse. The angle searched, being the so-called Doppler angle which can be readily calculated by means of the processor 1, is then the angle enclosed by said small line segment of line (not shown) with respect to the vertical (in FIG. 1) which is identical to the direction of the echographic excitation (vector 10). This method is time-consuming, intricate and not very accurate. In order to improve this situation, the microprocessor 1 is arranged to calculate said Doppler angle in a fast and exact manner on the basis of the designation of a single point, referred to as the initial point, in a trace of the blood vessel chosen by the user (the radiologist, the operator). To this end, a special-purpose processor 11, comprising the processor 1, also includes calculation means 12 necessary for carrying out the invention as described hereinafter in several sections which successively describe the principle of the method and its execution details, and in an annex which specifies given calculations in detail.

Generally speaking, the method comprises two steps: segmentation of the local trace 9 of the vessel in the image 8 and linear regression over the assembly of resultant points, referred to as a local mark, in order to establish the direction of its axis.

Figure 2:
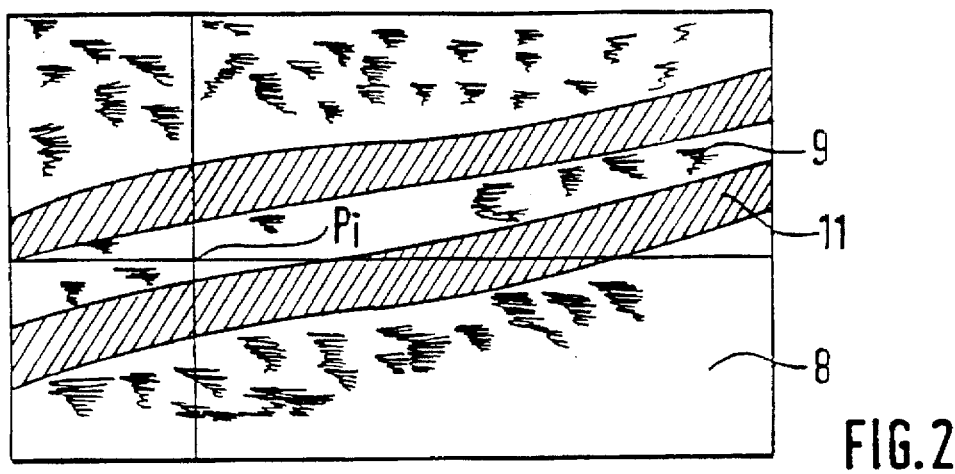
FIG. 2 shows an echographic image in which an initial point is selected.

An echographic image may contain the traces of several vessels which may be of interest to a radiologist, so that it is necessary for the operator to indicate the vessel of interest in the image before any treatment can intervene, by means of the mouse of the system as shown in FIG. 2 in which the initial point Pi is selected within the local trace 9 of a blood vessel.

Subsequently, in order to characterize alignment with respect to the shape of the vessel chosen, first its local mark is extracted from the surrounding grey level in the image. This segmentation of the vessel is actually the detection of the walls of the vessel around the initial point indicated by the user (the practician, the physician).

Therefore, the user must perform the pointing operation in a uniform dark part of the vessel and it is also necessary to have a threshold value available (referred to as $T_{i-1}$) which separates the reflectivity levels of the wall 11bis and the blood reflectivity levels (trace 9), thus leaving the operator a given margin so as to avoid small tissue pans which are hardly visible and which could be present inside the vessel.

For the determination of such a threshold value, preferably made of a conventional algorithm which is called ISODATA in the work: "Traitement numérique des images", by MURAT KUNT, Collection Technique et Scientifique des Télécommunications Presses Polytechniques et Universitaires Romanes. This algorithm is based on a histogram of grey levels of pixels which comprises at least two classes. Preferably, a histogram comprising three classes is chosen: $CL_1$=VESSEL (low reflectivity), $CL_2$=INTERMEDIATE and $CL_3$=WALL (high reflectivity). The threshold value $T_2$ which lies between the class INTERMEDIATE and the class WALL is used in order to achieve the desired reliable wall detection.

The thresholds enable determination as to whether the starting point suitably belongs to the class VESSEL; this may urge the operator to start pointing anew if the initial location is erroneous, thus constituting an a posteriori validation of the initial point.

Figure 3:
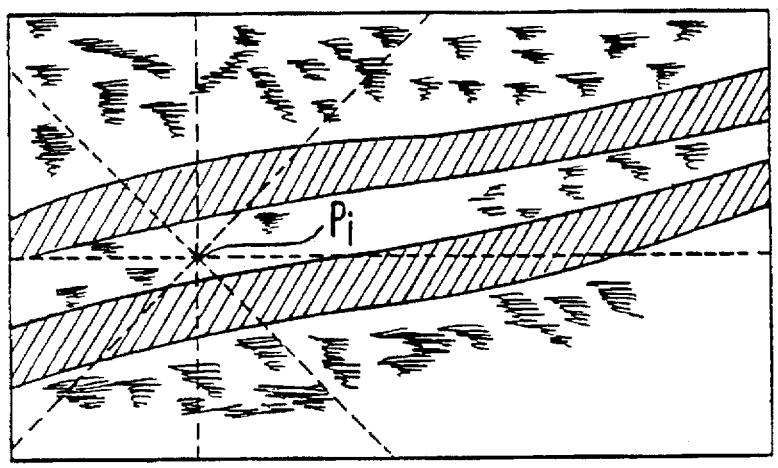
FIG. 3 illustrates the first tracing of rays from the initial point.

For as fast as possible operation, use is made of a partial histogram which utilizes a ray tracing method: as from the chosen initial point Pi, a predetermined number of radial rays which are angularly distributed in an isotropic fashion, are traced in the image until the edge is reached, and only the pixels encountered along rays participate in the formation of the histogram. This ray tracing method is shown in FIG. 3.

Figure 4:
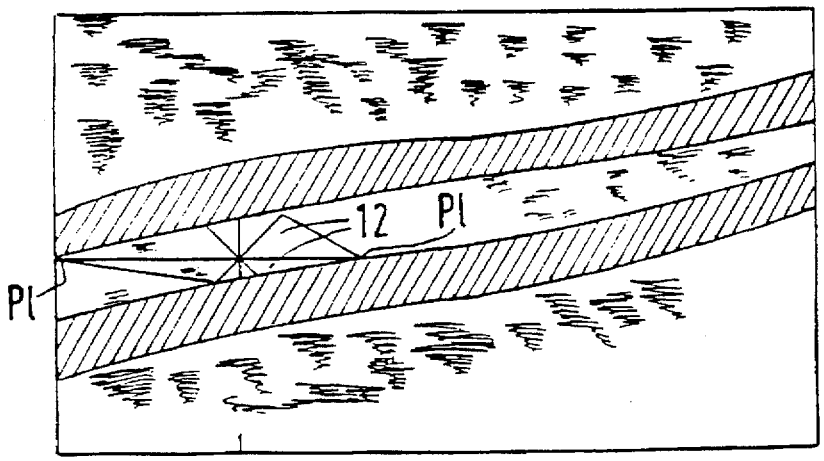
FIG. 4 shows the second tracing of rays, producing the first local mark.
Figure 5:
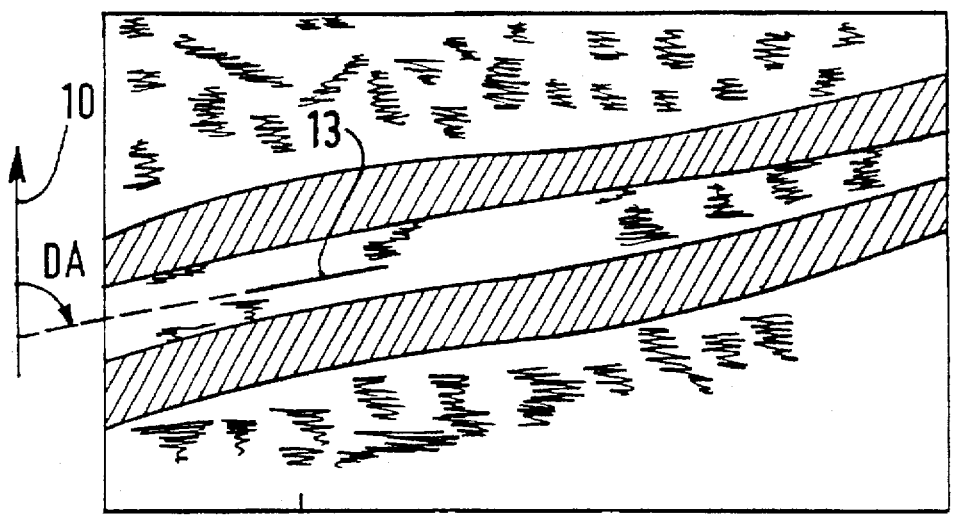
FIG. 5 shows the regression line deduced from the first local mark.

When the ISODATA algorithm has produced the required threshold value $(T_{i-1})$, the same ray tracing method as described above is used to find the first pixel P1 relating to a wall along each ray (it is ensured that a start is made within the vessel because of prior intervention by the user): progression along each ray stops as soon as the grey-level value of the instantaneous pixel exceeds the threshold value $T_{i-1}$ (the reflectivity of the wall exceeds that of the blood). If it happens that an edge of the image interrupts the mark of the vessel, the estimated end of the vessel in this direction does not constitute a true wall, but still the pixels between two angularly adjacent rays will constitute a fraction of the local mark of the vessel. The latter step provides sampling of segments forming the limits of the vessel in the image and, by joining the extremities of each pair of successive rays, a representation of the vessel is obtained which is composed of triangular sectors 12bis as shown in FIG. 4.

These sectors are characterized by the coordinates of their external apexes $P1_j$, $P1_{j+1}$, the third point being the common origin Pi. For each sector six analytical formulas are applied to the coordinates of its two external apexes so as to supply the local information necessary to enable ultimately a linear regression to be carried out on the entire local mark of the vessel.

The value of the Doppler angle DA (FIG. 5) is thus deduced directly from the slope a of the regression line 13, the direction of the ultrasonic transmission axis (or excitation axis) which is known (vector 10), and finally a correlation coefficient r which can be calculated in parallel and supplies an indication as regards the relevance of the result obtained.

Figure 6:
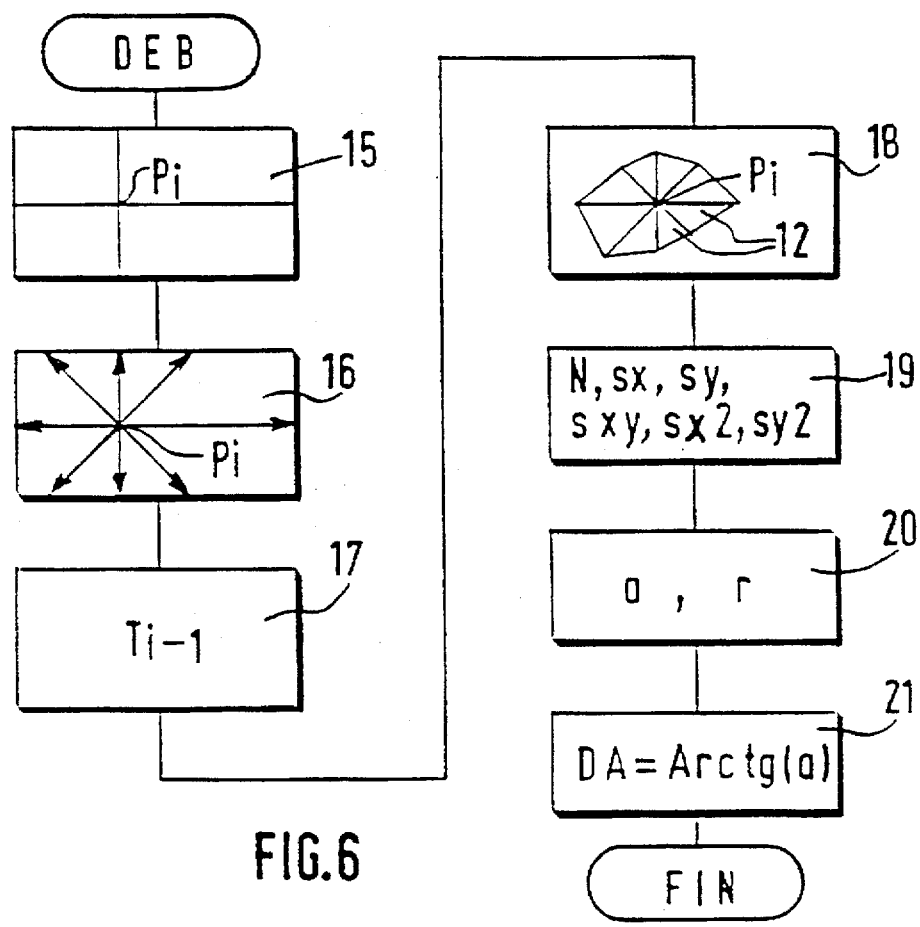
FIG. 6 shows an organigram summarizing the execution of the entire method of the invention.

The execution of the entire process is summarized in the organigram of FIG. 6. During the first step, at 15, the coordinates of the initial point (or pixel) Pi are stored in the memory 4 (see FIG. 1). At 16, the first ray tracing is performed, starting from the initial point. At 17, the threshold $T_{i-1}$ is determined on the basis of the histogram of selected points. At 18, a second ray tracing, associated with the threshold $T_{i-1}$, enables formation of the first local mark which is constituted by assembled triangular sectors 12. At 19, the calculations and accumulations for the sectors are performed. At 20, the results obtained during the preceding step are used for the linear regression step (calculation of a and of r), and finally the result, being the angle DA, is obtained during step 21.

The following is an example of the execution of the described process. It will be noted first of all that the process considered requires the same sampling step on the horizontal and vertical axes; therefore, it must be applied to images which have been subjected to a digital scan conversion (DSC) operation. As DSC is a prior necessity for treatment, the images may be acquired from any type of transducer network. Actually, the image used as a basis is the reflectivity image in grey levels which is customarily displayed on the screen of the system (of the workstation).

RAY TRACING AND FORMATION OF THE HISTOGRAM

First of all, the operator performs a pointing operation in the image by designation of a location in the vessel. The ray tracing operation thus consists in the recursive addition (by simple programming which will be evident to those skilled in the art) of pairs of shifts in x and in y (each pair characterizing a ray) to the coordinates of this location until the edge of the image is reached. For each intermediate position a pixel of the image is addressed along a linear ray (see FIG. 3).

Evidently, the larger the number of rays, the better the sampling of the area of the vessel will be. In practice it has been found that taking less than 32 rays could occasionally be insufficient, whereas choosing 32 rays has always given good results with the experimentally obtained data. Therefore, it is suggested to use preferably 32 rays.

If the number of grey levels in the image is denoted as NGL, this processing step supplies a set of NGL integers, each value of which indexed by q (q=0, 1, ..., NGL), has been incremented by 1 for each pixel of a value indexed by q along the course of the rays.

ISODATA COALESCENCE ALGORITHM

This algorithm aims to determine threshold values so as to classify the pixels of the image segmented in nc groups having a physical significance in respect of the contents of the image.

In this case 3 (nc=3) classes (VESSEL, INTERMEDIATE, WALL) are chosen whose behaviour (the reflectivity) is well known, and the threshold value $T_2$ between the classes INTERMEDIATE and WALL is needed. This grouping algorithm performs an overall segmentation of the image by determination of threshold values deduced from the histogram of the grey levels of the image which, therefore, is not dependent (at least not in the first order) on the location of the object to be segmented. This algorithm necessitates only an initial choice of the value of the mean grey level for each class, and iterative updating of these values is terminated by the supply of threshold values between classes.

First Initialization Step:

Let h(j) be the probability density of the grey-level value j in the original image.

Let [min,max] be the smallest grey-level value interval encompassing the values of h(j) which are not zero.

Let $m_i$, $i \in \{1, \ldots, nc\}$ be the mean initial value for all classes. This initial estimation may be carried out by dividing the axis of the grey levels into nc equidistant intervals and by calculating the arithmetical mean value over each interval as if the probability density was uniform between min and max.

Second Step:

The (nc−1) threshold values $T_i$ are estimated by utilizing the following relation (where [x] represents the integer part of x):

$$T_i=[(m_i\_m_{i+1})/2], i \in \{1 \ldots, nc-1\}$$

All pixels whose grey-level values are situated in the interval:

$$A_i=[T_{i-1}, T_i], i \in \{1, \ldots, nc\}$$

are then assigned to the class i (where $T_o$=min−1 and $T_{nc}$=max).

Third Step:

The mean values of the classes are updated by utilizing the following relation (where [x] represents the integer part of x):

$$m_i = \frac{\left[\sum_{j \in A_i} jh(j)\right]}{\left[\sum_{j \in A_i} h(j)\right]}, i\{1,\ldots,nc\}.$$

Fourth and Last (Iteration) Step:

If at least one of the $m_i$ values has been modified during the third step, it is necessary to return to the second step, thus performing a loop until the algorithm converges; if not, the final threshold values are obtained. This processing step produces an integer threshold value $T_{i-1}$ which separates the blood from the arterial walls across the image.

WALL DETECTION AND REPRESENTATION OF THE VESSEL IN SECTORS

Once the desired threshold value $T_{i-1}$ has been obtained, the same ray tracing method is carried out as described above in order to detect the area in which the wall of the vessel commences, along each ray scanned simply, by comparing the values of pixels along a ray with the threshold value. The coordinates of the last pixel marking the presence of the wall, along each ray, is stored in the memory (the memory 4 in FIG. 1).

Thus, a sampling of the limits of the wall of the vessel in the image is obtained and, by joining each pair of ends of rays which succeed one another angularly, a representation of the vessel is obtained which is composed of triangular radial sectors (see FIG. 4).

Let nr be the number of rays. This processing step produces two sets of nr integer numbers whose values, indexed by s, correspond to the coordinates of the last point of the ray indexed by s, so $Pl_s$.

CHARACTERIZATION OF THE REPRESENTATION IN SECTORS

The actual object of the whole operation is to supply the following two parameters:

The slope a of the regression line deduced by the conventional least-squares method, supplying the tangent of the Doppler angle DA (DA=Arc tg a):

$$a = \frac{N \sum_{n=1}^{n=N} x(n)y(n) - \sum_{n=1}^{n=N} x(n) \sum_{n=1}^{n=N} y(n)}{N \sum_{n=1}^{n=N} x(n)x(n) - \sum_{n=1}^{n=N} x(n) \sum_{n=1}^{n=N} x(n)},$$

where $\{x(n),y(n)\}$, $n \in \{1, \ldots, N\}$, are the coordinates of the pixels comprised in the representation of the vessel in triangular sectors, i.e. pixels relating to the local mark.

The correlation coefficient r whose absolute value will be nearer to 1 as the representation in sectors is nearer to a collection of points presenting a regular alignment along a given axis ($0 \leq |r| \leq 1$):

$$r = \frac{N \sum_{n=1}^{n=N} x(n)y(n) - \sum_{n=1}^{n=N} x(n) \sum_{n=1}^{n=N} y(n)}{\sqrt{N \sum_{n=1}^{n=N} x(n)x(n) - \sum_{n=1}^{n=N} x(n) \sum_{n=1}^{n=N} x(n)} \sqrt{N \sum_{n=1}^{n=N} y(n)y(n) - \sum_{n=1}^{n=N} y(n) \sum_{n=1}^{n=N} y(n)}}.$$

From a practical point of view, the determination of these two values (a and r) requires measurement and accumulation, over the whole local mark, of six different quantities (six terms) deriving a contribution from the coordinates of each pixel contained therein:

$$N \text{ (total number of pixels)}, sx = \sum_{n=1}^{n=N} x(n), sy = \sum_{n=1}^{n=N} y(n),$$

$$sxy = \sum_{n=1}^{n=N} x(n)y(n), sy2 = \sum_{n=1}^{n=N} y(n)y(n), sx2 = \sum_{n=1}^{n=N} x(n)x(n).$$

The justification of the decomposition of the local mark of the vessel into triangular sectors is found here: the values of the above parameters, characterizing all points contained in a given sector, can indeed be deduced from the coordinates of the two external apexes of this sector exclusively. This signifies that the characterization of a sector is realised by application of 6 analytical formulas to 4 integer values as explained hereinafter.

Figure 7:
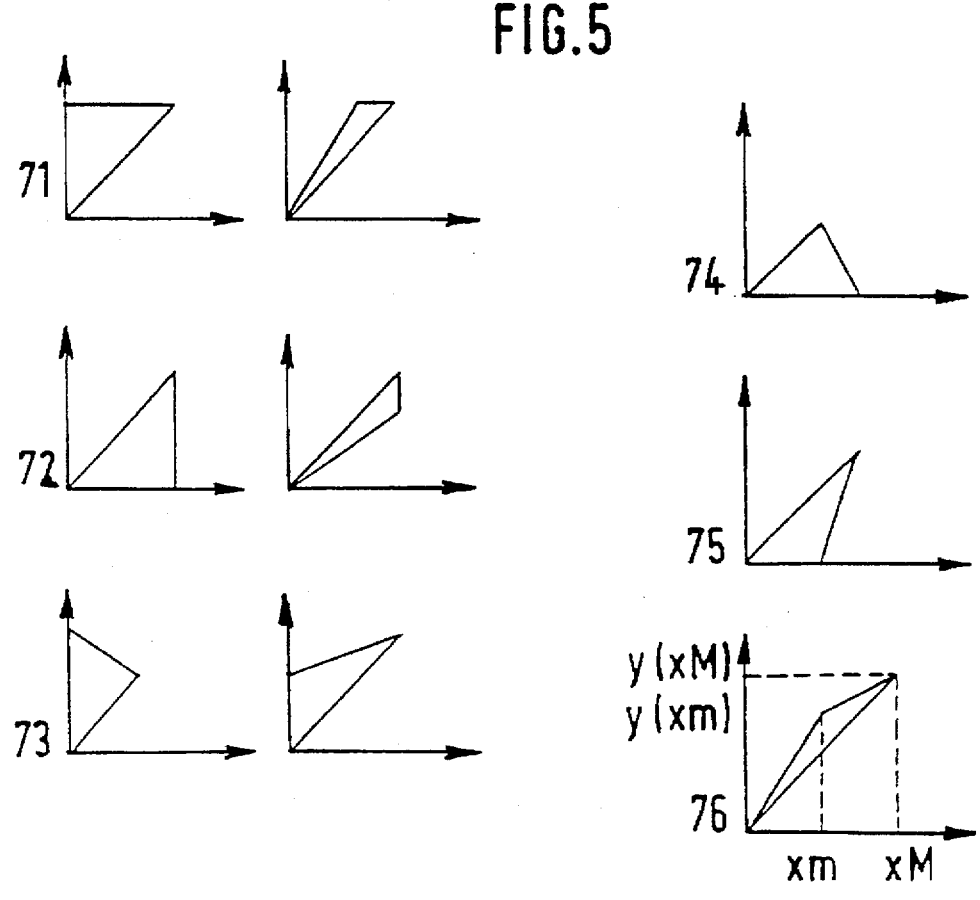
FIG. 7 shows the various feasible shapes of triangular sectors of the local mark.

Let $[xm,y(xm)]$ and $[xM,y(xM)]$ be the coordinates of the two external apexes $(Pl_i,Pl_{i+1})$. where $xM \geq xm$, the sector considered being situated by symmetry, in the first trigonometric quadrant from the top and the right (by multiplication of the negative coordinates by $-1$ until $x>0$ and $y>0$). 6 types of different possible sectors are obtained, being in this configuration restricted to the first quadrant, in dependence on the values and the relative sequencing of the coordinates of the external apexes as shown in FIG. 7 (see notably line 76 of FIG. 7).

In this FIG. 7 classes of sectors can be distinguished which represent all possible shapes of sectors, said classes being shown as 7 lines which are referenced as 71, 72, 73, 74, 75, 76, 77 from the top down, the lines 71, 72 and 73 each representing two sector shapes which both relate to the same respective class. These classes are characterized as follows:

71: y(xm)=y(xM)
72: xm=xM
73: xm=0
74: y(xM)=0
75: y(xm)=0
76: y(xm)>y(xM) x xm/xM
77: y(m)<y(xM) x xm)xM.

The classes of the lines 76 and 77, being characterized by inequalities in the opposite sense in relation to the same expression, may be considered as belonging to the same class from a mathematical point of view.

The above-mentioned analytical formulas used for the calculations are:

$$sf = \int_{x=0}^{x=xm} \int_{y=a_0x}^{y=a_1x} f(x,y) \, dx \, dy +$$

$$\int_{x=xm}^{x=xM} \int_{y=a_1x+b_2}^{y=a_3x+b_3} f(x,y) \, dx \, dy$$

where:
f(x,y)=1 for deducing the pixels and obtaining N
f(x,y)=x in order to obtain sx
f(x,y)=y for obtaining sy
f(x,y)=xy for obtaining sxy
f(x,y)=xx for obtaining sx2
f(x,y)=yy for obtaining sy2.

The integration limits of course, are dependent on the shape of the sector as indicated in Annex 1 (relating to the classes of FIG. 7). but the ultimate expressions to be calculated so as to perform the summing for each type of sector are very simple and do not require a substantial calculation effort as indicated in annex 2 (relating to the classes of FIG. 7).

When each sector of the representation of the vessel has been treated, the actual regression can be performed.

LINEAR REGRESSION AND ESTIMATION OF THE VALIDITY OF THE RESULT

The Doppler angle DA and the reliability criterion r are obtained directly from 6 values supplied at the end of the foregoing step, after treatment of all sectors:

$$a = \frac{N \, sxy - sx \, sy}{N \, sx2 - sx \, sx}$$

On the other hand:

$$r = \frac{N \, sxy - sx \, sy}{\sqrt{N \, sx2 - sx \, sx} \, \sqrt{N \, sy2 - sy \, sy}}.$$

This value r is a control parameter which may be used to form a reliability criterion for the measurement: if its value is larger than, for example 0.5, the result may be considered to be reliable; if not, there is problem which prevents the system from supplying a valid result (notably a local mark having a circular shape due to poor positioning of the sectional plane) and the operator will have to make another attempt after correction.

The basic method described above can be refined by applying it to successive areas within the vessel by automatic centring.

Once a first representation in sectors of the vessel has been realised, it is easy to calculate the coordinates of its centre of gravity G (for example, by taking the mean value of the abscissae and the ordinates of the pixels of the first local mark and, while choosing this point G as the new initial point, by repeating the entire process described above so as to determine a second local mark which has been optimized and also an optimized Doppler angle). This enhancement of the method enables a larger margin in respect of the choice of the initial point so that the user can benefit from automatic centring within the vessel (for example, it is thus possible to indicate, using the mouse of the workstation, a location close to a wall without being penalized), and the results obtained will be more reliable (standard deviation of less than 1°).

It is to be noted that this first repeat of the entire process may be reiterated, for example a predetermined number of times which may be as high as 20, or until convergence on a particular point is obtained. The latter point corresponds to the centre of gravity of the entire trace of the vessel in the echographic image and not only to that of the first local mark deduced from the choice of the first initial point by the user. Thus, the method no longer concerns a local measurement, but offers the best environment along the entire trace of the vessel in order to extract the value of the Doppler angle therefrom.

ANNEX 1: Integration limits for each triangular sector configuration line 1:
$y(xm) = y(xM)$
$a_0 = y(xm)/xM$
$a_1 = y(xm)/xm$
$a_2 = y(xm)/xM$
$b_2 = a_3 = 0$
$b_3 = y(xm)$ line 2:
$xM = xm$
$a_0 = MIN[y(xm), y(xM)]/xm$
$a_1 = MAX[y(xm), y(xM)]/xm$
$a_2 = b_2 = a_3 = b_3 = 0$ line 3:
$xm = 0$
$a_0 = a_1 = b_2 = 0$
$a_2 = y(xM)/xM$
$a_3 = [y(xM) - y(xm)]/xM$
$b_3 = y(xm)$ line 4:
$y(xM) = 0$
$a_0 = a_2 = b_2 = 0$
$a_1 = y(xm)/xm$
$a_3 = -y(xm)/xM - xm$
$b_3 = y(xm) - a_3 \times xm$ line 5:
$y(xm) = 0$
$a_0 = b_3 = 0$
$a_1 = y(xM)/xM$
$a_2 = y(xM)/(xM - xm)$
$b_2 = -a_2 \times xm$
$a_3 = y(xM)/xM$ lines 6 and 7:
$y(xm)$
$<$ or $>$
$y(xM) \times xm/xM$
$a_0 = y(xm)/xm$ or $y(xM)/xM$
$a_1 = y(xM)/xM$ or $y(xm)/xm$
$a_2 = [y(sM) - y(xm)]/(xM - xm)$ or $y(xM)/xM$
$b_2 = y(xm) - a_2 \times xm$ or $0$
$a_3 = y(xM)/xM$ or $[y(xM) - y(xm)]/(sM - xm)$
$b_3 = 0$ or $y(xm) - a_3 \times xm$ ANNEX 2: Expression to be calculated (in this table $s \mathrel{+}= x$ signifies: add $x$ to $s$)

line 1:
$y(xm) = y(xM)$
$sn \mathrel{+}= y(xm) \times (xM - xm)/2$
$sx \mathrel{+}= y(xm) \times (xM - xm) \times (xM + xm)/6$
$sy \mathrel{+}= y(xm)^2 \times (xM - xm)/3$
$sxy \mathrel{+}= y(xm)^2 \times (xM - xm) \times (xM + xm)/8$
$sx2 \mathrel{+}= y(xm) \times (xM^3 - xm^3)/12$
$sy2 \mathrel{+}= y(xm)^3 \times (xM - xm)/4$ line 2:
$xM = xm$
$YMAX = MAX[y(xm), y(xM)]$
$YMIN = MIN[y(xm), y(xM)]$
$sn \mathrel{+}= xm \times (YMAX - YMIN)/2$
$sx \mathrel{+}= xm^2 \times (YMAX - YMIN)/3$
$sy \mathrel{+}= xm \times (YMAX - YMIN) \times (YMAX + YMIN)/6$
$sxy \mathrel{+}= xm^2 \times (YMAX - YMIN) \times (YMAX + YMIN)/8$
$sx2 \mathrel{+}= xm^3 \times (YMAX - YMIN)/4$
$sy2 \mathrel{+}= xm \times (YMAX^3 - YMIN^3)/12$ line 3:
$xm = 0$
$sn \mathrel{+}= xM \times y(xm)/2$
$sx \mathrel{+}= xM^2 \times y(xm)/6$
$sy \mathrel{+}= xM \times y(xm) \times [y(xM) + y(xm)]/6$
$sxy \mathrel{+}= xM^2 \times y(xm) \times [2 \times y(xM) + y(xm)]/24$
$sx2 \mathrel{+}= xM^3 \times y(xm)/12$
$sy2 \mathrel{+}= xM \times y(xm) \times [y(xM)^2 + y(xM) \times y(xm) + y(xm)^2]/12$ line 4:
$y(xM) = 0$
$sn \mathrel{+}= xM \times y(xm)/2$
$sx \mathrel{+}= xM \times y(xm) \times (xM + xm)/6$
$sy \mathrel{+}= xM \times y(xm)^2/6$
$sxy \mathrel{+}= xM \times y(xm)^2 \times (xM + 2 \times xm)/24$
$sx2 \mathrel{+}= xM \times y(xm) \times (xM^2 + xM \times xm + xm^2)/12$
$sy2 \mathrel{+}= xM \times y(xm)^3/12$ line 5:
$y(xm) = 0$
$sn \mathrel{+}= xm \times y(xM)/2$
$sx \mathrel{+}= xm \times y(xM) \times (xM + xm)/6$
$sy \mathrel{+}= xm \times y(xM)^2/6$
$sxy \mathrel{+}= xm \times y(xM)^2 \times (2 \times xM + xm)/24$
$sx2 \mathrel{+}= xm \times y(xM) \times (xM^2 + xM \times xm + xm^2)/12$
$sy2 \mathrel{+}= xm \times y(xM)^3/12$ lines 6 and 7:
$y(xm) <$
$y(xM) \times xm/xM$
if
$y(xm) >$
$y(xM) \times xm/xM$
multiply each
expression by $-1$.

$sn \mathrel{+}= [xm \times y(xM) - xM \times y(xm)]/2$
$sx \mathrel{+}= (xM + xm) \times [xm \times y(xM) - xM \times y(xm)]/6$
$sy \mathrel{+}= [y(xM) + y(xm)]$
$\quad \times [xm \times y(xM) - xM \times y(xm)]/6$
$sxy \mathrel{+}= [xm \times y(xM) - xM \times y(xm)]$
$\quad \times [2 \times xM \times y(xM) + xm \times y(xM)$
$\quad + xM \times y(xm) + 2 \times xm \times y(xm)]/24$
$sx2 \mathrel{+}= [xm \times y(xM) - xM \times y(xm)]$
$\quad \times (xM^2 + xM \times xm + xm^2)/12$ -continued ANNEX 2: Expression to be calculated (in this table s += x signifies: add x to s)

sy2 += [xm × y(xM) − xM × y(xm)]
× [y(xM)$^2$ + y(xM) × xm) + y(xm)$^2$]/12

I claim:

1. A method for automatic determination of Doppler angle DA, enclosed by the direction of an echographic excitation and the axis of a relevant blood vessel in an ultrasonic echographic grey-level image, on the basis of prior designation of an initial point situated in the vicinity of the axis of the relevant vessel, comprising the following steps:
   a) first isotropic tracing of rays from said initial point which traverse the entire echographic image and forming a histogram of grey levels of selected points which are regularly distributed along said rays,
   b) applying an image processing algorithm to said histogram in order to classify the grey levels of said selected points into at least two classes $CL_1$, $CL_2$, . . . , two adjacent classes being separated by thresholds $T_1$, $T_2$, . . . , expressed in grey levels, one of the classes $CL_i$, bounded by a lower threshold $T_{i-1}$, being representative of walls of blood vessels in said image,
   c) second tracing of rays from said initial point, during which the grey level of each point of each ray is compared with the threshold $T_{i-1}$ and each ray is restricted to the first end point P1 encountered whose grey level is equal to or higher than $T_{i-1}$, and producing a representation of said relevant blood vessel in the form of a first local mark which is composed of triangular sectors which have said starting point within said first local mark in common,
   d) determining a slope (a) of the regression line of said first local mark by applying a linear regression method to the N pixels, having the coordinates x(n) and y(n) of said first local mark, as:

$$a = \frac{N(S)x(n)y(n) - (S)x(n)(S)y(n)}{N(S)x(n)x(n) - (S)x(n)(S)x(n)}$$

where:

$$(S) = \sum_{n=1}^{n=N}$$

e) and calculating a Doppler angle as:

DA=Arc tg (a).

2. A method as claimed in claim 1, further comprising a step of validating the value of the Doppler angle DA only for a correlation coefficient r of the pixels of said first local mark which exceeds a threshold Rm of predetermined value between 0 and 1, where:

$$r = \frac{N(S)x(n)y(n) - (S)x(n)(S)y(n)}{\sqrt{N(S)x(n)x(n) - (S)x(n)(S)x(n)} \sqrt{N(S)y(n)y(n) - (S)y(n)(S)y(n)}}$$

3. A method as claimed in claim 1, further comprising a step of validating the value of the Doppler angle DA only if the symmetry of said local mark with respect to its regression line (or its inertial axis) is considered to be sufficient, said symmetry being deduced from the calculation of a centered moment of order 3, being sk(f):

$$sk(f) = \frac{\frac{(S)y(n)(x(n)-mx)^3}{(S)y(n)}}{\left[\frac{(S)y(n)(x(n)-mx)^2}{(S)y(n)}\right]}$$

where $$mx = \frac{(S)y(n)x(n)}{(S)y(n)}$$

and f is the function:

y(n)=f(x(n)), where n is within [1, . . . , N], the centered moment of order 3 being calculated for two curves which are representative of the function f: sk1 for the curve formed by the extremities of rays of said local mark which are situated above the regression line (or the inertial axis) taken as the axis of the abscissae (y>o), sk2 for the curve formed by the extremities of rays situated below aid line (y<o), the values of sk1 and sk2 being compared afterwards.

4. A method as claimed in claim 1, characterized in that the terms for calculating the slope (a) of the regression line and of the correlation coefficient r are calculated for each triangular sector formed by two rays whose ends have the coordinates xm, y(xm) and xM, y(xM), on the basis of the following analytical formula:

$$sf = \int_{x_0}^{x_1} \int_{y_0}^{y_1} f(x,y)\, dx\, dy + \int_{x_1}^{x_2} \int_{y_2}^{y_3} f(x,y)\, dx\, dy,$$

in which the function f(x,y) is given the following successive values: 1; x; xy; xx; yy, and the coefficients $a_0$, $a_1$, $a_2$, $b_2$, $a_3$, $b_3$ are given sets of values which are dependent only on the coordinates of said end points of two rays, with 6 sets of possible values associated with 6 respective different classes of different triangular sectors.

5. A method as claimed in claim 1, further comprising a step for positioning which comprises calculating a center of gravity G of said first local mark, said center of gravity G then being chosen as a new initial point which has been optimized for subsequent repetition of the method for automatic determination of Doppler angle DA.

6. A method for measurement as claimed in claim 5, wherein said step for positioning and the subsequent repetition of the method for automatic determination of Doppler angle DA are repeated a predetermined number of times which is between 1 and 20.

7. An arrangement for automatic determination of Doppler angle DA, enclosed by the direction of an echographic excitation and the axis of a blood vessel in an ultrasonic echographic grey-level image, on the basis of prior designation of a initial pixel situated in the vicinity of the axis of the relevant vessel, which arrangement comprises:
   a memory for storing the grey-level values of the echographic image in the form of a matrix of pixels,
   a screen for displaying the echographic image in the form of a two-dimensional matrix of pixels, pointer means for pointing out said initial pixel in the displayed image, and calculation means which can access said memory and said initial point, the calculation means being arranged to perform:

first isotropic tracing of rays from said initial pixel which traverse the entire echographic image and formation of a histogram of grey levels of pixels which are selected so as to be regularly distributed along said rays, application of an image processing algorithm to said histogram in order to classify the grey levels of said selected pixels in at least two classes $CL_1$, $CL_2$, ..., two adjacent classes being separated by thresholds $T_1$, $T_2$, ..., expressed in grey levels, one of the classes $CL_i$, bounded by the lower threshold $T_{i-1}$, being representative of walls of blood vessels in said image, second tracing of rays from said initial pixel, during which the grey level of each pixel of each ray is compared with the threshold $T_{i-1}$ and each ray is restricted to the first end pixel Pl encountered whose grey level is equal to or higher than $T_{i-1}$, and production of a representation of said blood vessel in the form of a first local mark which is composed of triangular sectors which have said starting pixel within said first local mark in common, determination of a slope (a) of the regression line of said first local mark by application of a linear regression method to the N pixels, having the coordinates x(n) and y(n) of said first local mark, as:

$$a = \frac{N(S)x(n)y(n) - (S)x(n)(S)y(n)}{N(S)x(n)x(n) - (S)x(n)(S)x(n)}$$

and calculation of a Doppler angle as:

DA=Arc tg (a).

8. A method for automatic measurement as claimed in claim 1, comprising a step of automatically displaying the value of said Doppler angle DA in the field of a screen which contains the echographic image in the form of a two-dimensional matrix of pixels in grey levels and/or color, and of drawing a line segment representing the axis of the relevant vessel.

9. A method for automatic measurement as claimed in claim 1, wherein speed information is represented in the form of an image, or color speed map, with at least two colors, each of which is a function of the sign of the speed and a color intensity proportional to the absolute value of the speed, a speed color scale being represented in a field of the screen provided for this purpose, comprising a step of automatically correcting said speed color scale, so as to ensure that it contains a dynamic of the speeds observed along the axis of said relevant blood vessel, by automatically displaying the maximum positive and negative values of these speeds at the two extremities of said scale.

10. A method for measurement as claimed in claim 1, wherein evolution of a speed distribution in the course of time in a segment of the relevant vessel is represented in a mode M, on a screen provided for this purpose, in the form of a histogram showing a dynamic of speeds as a function of time, referred to as a Doppler spectrum, comprising a step of automatically correcting the scale of the speeds represented in said Doppler spectrum in order to ensure that it contains the dynamic of the speeds observed along the axis of said blood vessel.

11. A method for measurement as claimed in claim 1, further comprising a step of validating the value of the Doppler angle DA only for a correlation coefficient r of the pixels of said first local mark which exceeds a threshold Rm of predetermined value between 0 and 1, where:

$$a = \frac{-2(S)x(n)y(n)}{(S)x(n)x(n) - (S)y(n)y(n) + \sqrt{4((S)x(n)y(n))^2 + (S)x(n)x(n) - (S)y(n)y(n))^2}}.$$

\* \* \* \* \*